United States Patent [19]

Sekiguchi et al.

[11] 4,254,306
[45] Mar. 3, 1981

[54] KEY TELEPHONE SYSTEM

[75] Inventors: Kouichi Sekiguchi, Asaka; Toshiichi Takano, Kokubunji, both of Japan

[73] Assignee: Iwasaki Tsushinki Kabushiki Kaisha, Japan

[21] Appl. No.: 967,017

[22] Filed: Dec. 6, 1978

Related U.S. Application Data

[63] Continuation of Ser. No. 754,570, Dec. 27, 1976.

[30] Foreign Application Priority Data

| Dec. 26, 1975 | [JP] | Japan | 50-156723 |
| Dec. 26, 1975 | [JP] | Japan | 50-156724 |
| Dec. 26, 1975 | [JP] | Japan | 50-156725 |
| Dec. 26, 1975 | [JP] | Japan | 50-156726 |
| Dec. 26, 1975 | [JP] | Japan | 50-156727 |
| May 19, 1976 | [JP] | Japan | 51-57494 |
| May 19, 1976 | [JP] | Japan | 51-57495 |

[51] Int. Cl.² ............................................. H04Q 5/20
[52] U.S. Cl. ................................ 179/99 R; 179/99 E
[58] Field of Search ............... 79/99, 18 F, 18 FA, 79/81 R, 81 C

[56] References Cited

U.S. PATENT DOCUMENTS

| 3,453,396 | 7/1969 | Lacey et al. | 179/99 |
| 3,676,608 | 7/1972 | Goldthorp et al. | 179/99 |
| 3,739,104 | 6/1973 | O'Neill | 179/99 |
| 3,860,763 | 1/1975 | Sudoh et al. | 179/99 |
| 3,961,144 | 6/1976 | Hirate | 179/99 |
| 4,010,331 | 3/1977 | Taylor et al. | 179/99 |
| 4,024,353 | 5/1977 | Hidikata et al. | 179/99 |
| 4,079,212 | 3/1978 | Sasai | 179/99 |
| 4,125,749 | 11/1978 | Kinoshita et al. | 179/99 |

Primary Examiner—Gerald L. Brigance
Attorney, Agent, or Firm—Robert E. Burns; Emmanuel J. Lobato; Bruce L. Adams

[57] ABSTRACT

A key telephone system, in which a key service unit is provided for selectively connecting a plurality of key telephone sets to a CO line by two control lines and a talking line. The key service unit is comprised of a DC power source having two terminals of a positive output voltage and a negative output voltage, a first detector connected to one of two control lines for detecting a state where one of the two output voltages is applied across the two control lines to flow a current of predetermined value therethrough, a first switch for connecting the other output voltage across the control lines in response to the output of the first detector, a second detector connected to the other of the two control lines for detecting a state where the other of the output voltages is applied across the two control lines to flow a current larger than a certain value therethrough, and a second switch for connecting the talking line to the CO line in response to the output of the second detector. Additional circuitry is further provided to perform the intercomm. talking operation, the holding operation for the CO line, and the privacy operation and other functions.

17 Claims, 13 Drawing Figures

PRIVACY LINE

KEY TELEPHONE SYSTEM

This is a continuation of application Ser. No. 754,570, filed Dec. 27, 1976.

This invention relates to a key telephone system using one CO line.

Conventional key telephone systems of this kind require a dozen or so insulated conductors of a cable, and this presents serious difficulties in the laying of the cable in respect of cost and space.

An object of this invention is to provide a key telephone system, which reduces the dozen or so insulated conductors of the cable employed in the past to four to avoid the above-mentioned defects of the prior art, that is, to reduce the cost and space in the cable laying, but which is capable of performing principal functions required of a key telephone system by two control lines.

The principle, construction and operation of this invention will be clealy understood from the following detailed description taken in conjunction with the accompanying drawings, in which.

Figure 1:
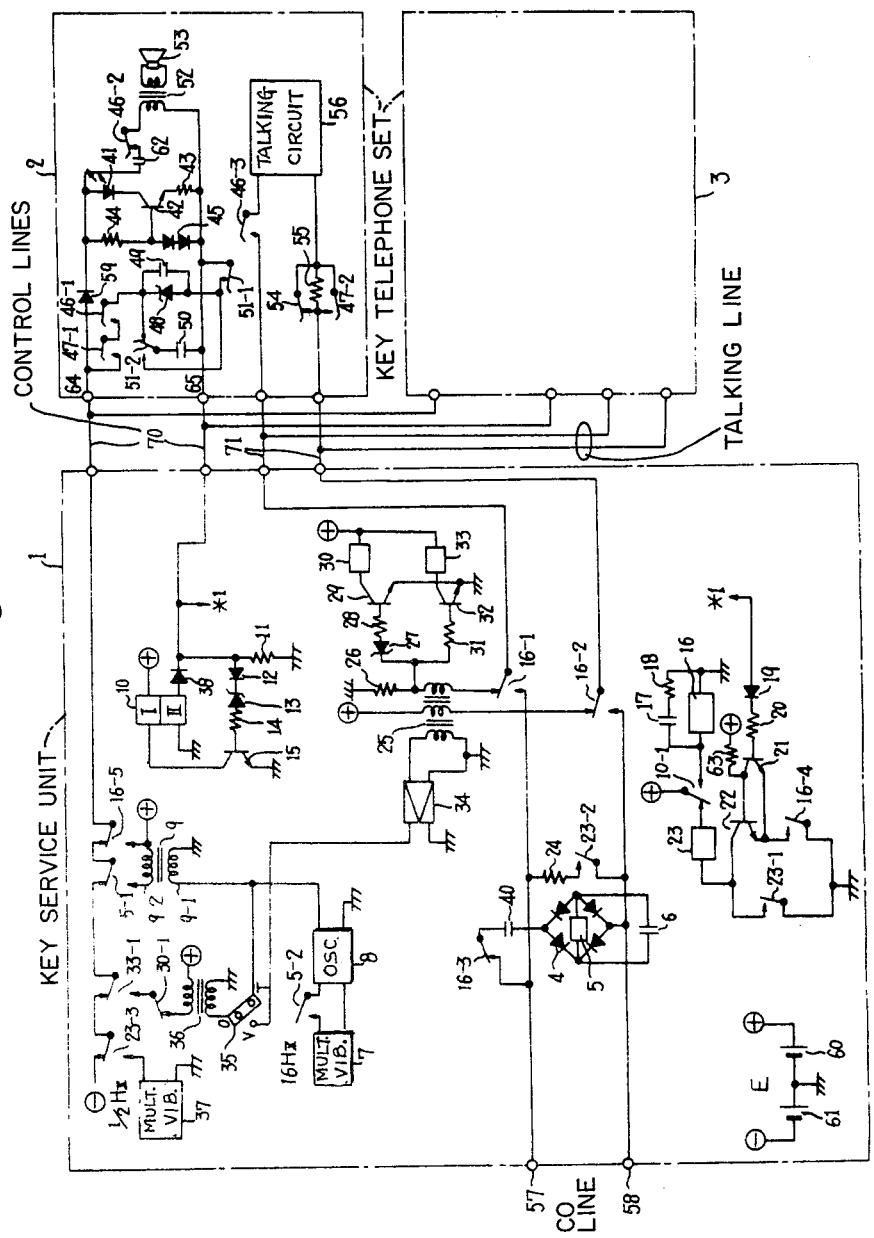
FIG. 1 is a circuit diagram illustrating an embodiment of this invention.

With reference to FIG. 1, an embodiment of this invention will be described. Reference numeral 1 indicates a key service unit; 2 and 3 designate key telephone sets, the circuit of the key telephone set 3 being omitted because it is identical with that of the key telephone set 2; and 4 identifies a rectifier bridge composed of four diodes. Reference numerals 5, 10, 16, 23, 30 and 33 represent relays; 5-1 and 5-2 denote contacts of the relay 5; 10-1 shows a contact of the relay 10; 16-1, 16-2, 16-3, 16-4 and 16-5 refer to contacts of the relay 16; 23-1, 23-2 and 23-3 indicate contacts of the relay 23; 30-1 designates a contact of the relay 30; and 33-1 identifies a contact of the relay 33. Reference numerals 6, 17, 40, 49, 50 and 62 denote capacitors; 7 represents a multivibrator of 16 Hz; 8 denotes a sine-wave oscillator of about 400 to 1000 Hz; 9, 25, 36 and 52 show transformers; 11, 14, 18, 20, 24, 26, 28, 31, 43, 44, 55 and 63 refer to fixed resistors; 12, 19, 38, 45 and 59 indicate diodes; 13, 27 and 48 designate constant-voltage diodes; 15, 21, 22, 29, 32 and 42 identify transistors; 34 denotes an amplifier; and 35 represents a change-over bar, which is connected in a path O-T in the circuit illustrated in FIG. 1. Reference numeral 37 shows a multivibrator of about ½ Hz; 41 refers to a light emitting diode or a like light emitting element; 46-1, 46-2 and 46-3 indicate contacts of a hook switch; 47-1, 47-2 and 51-1, 51-2 designate respective contacts of a CO line selecting key and a CO line holding interlocking key; 53 identifies a speaker; 54 denotes a contact of a push-button switch; 56 represents a talking circuit of the key telephone set; 57 and 58 show CO line terminals; 60 and 61 refer to DC power sources; 64 and 65 indicate control line terminals; 70 designates two control lines; and 71 identifies a talking line.

In FIG. 1, the DC power sources 60 and 61 have a positive output terminal and a negative output terminal. The winding II of the relay 10 and the diode 38 are connected to one of the two control lines 70 to form a first detector for detecting a state where one of the output voltages of the power sources 60 and 61 is applied across the two control lines so that a current of predetermined value flows through the control lines 70. The contact 10-1, the relay 16 and the contact 16-5 make up first switching means for switching the other of the output voltages from the power sources 60 and 61 across the control lines 70 in response to the output (10-1) from the first detector. The resistor 11, the diode 12, the constant-voltage diode 13, the resistor 14, the transistor 15 and the winding I of the relay 10 are connected to one of the control lines 70 to constitute a second detector for detecting a state where the other of the two output voltages from the power sources 60 and 61 is applied across the control lines 70 so that a current exceeding a certain value flows through the control lines 70. The contact 10-1, the relay 16 and the contact 16-1 form second switching means for connecting the talking line terminals 71 to the CO lines 57 and 58 in response to the output from the second detector. Further, the diodes 4, the relay 5 and the capacitor 6 are connected to the CO line terminals 57 and 58 to provide a third detector for detecting the arrival of an incoming signal at the CO line terminals 57 and 58. The multivibrator 7, the oscillator 8 and the contact 5-2 form a first signal source for sending out a signal indicative of the state of the incoming signal. The windings 9-1 and 9-2 of the transformer 9 and the contacts 5-1 and 16-5 make up connecting means for connecting the first signal source to the control lines 70 in response to the output from the third detector and for disconnecting the first signal source from the control lines 70 in response to the output from the second detector.

In the key telephone set 2 (or 3), the light emitting element 41 is one which is provided with current limiting means 42 and 43 which operate in response to one polarity of the voltage applied to the control lines 70. The contacts 46-1, 47-1, and 51-1, and the constant voltage diode 48 form control means including an ON-OFF control switching element for seizing the CO line. The transistor 42, the contact 46-2 of the hook switch, the transformer 52 and the speaker 53 constitute a speaker circuit. The light emitting element provided with the current limiting means, the control means and the speaker circuit are connected to the control lines 70 in parallel with each other. In the control means, the constant-voltage diode 48, which produces a voltage drop necessary for the actuation of the light emitting element 41 in response to the applied voltage of the above-mentioned polarity, is connected in series with the aforementioned switching elements or contacts 46-1, 47-1 and 51-1.

In the following, the operation of the key telephone system will be described. In operations such as (1) reception of an incoming signal from the CO line and its indication, (2) answering to the incoming signal, (3) talking operation through the CO line and its indication, (4) holding and its indication, (5) intercomm. calling, (6) intercomm. talking operation and (7) calling for the CO line, which are basic functions of ordinary key telephone systems, the operations of (1) reception of an incoming signal from the CO line and its indication, (2) answering to the incoming signal and (7) calling for the CO line will first be described.

(1) Reception of incoming signal from the CO line and its indication

When the CO line has been connected to the terminals 57 and 58 and an incoming signal (which is usually an AC signal of 16 Hz) has been applied from an exchange in the central office, the incoming signal is rectified by a rectifier circuit formed by the rectifier bridge 4 and the capacitor 6, to thereby actuate the relay 5. By the operation of the relay 5, its contact 5-1 is changed over to flow a direct current via a route [power source⊕→secondary winding 9-2 of transformer 9→contact 5-1→contact 16-5→control line terminal 64→diode 59→light emitting diode 41→transistor 42→fixed resistor 43→control line terminal 65→fixed resistor 11→ground E], actuating the light emitting diode 41. Further, the contact 5-2 is switched to the ON-state and the output from the oscillator 8 is modulated by the output signal (of about 16 Hz) from the multivibrator 7, the output from which is applied to the primary winding 9-1 of the transformer 9 and induced in the secondary winding 9-2 and then applied to the route, in which the abovesaid direct current has flowed. As a result of this, an alternating current flows via a route [secondary winding 9-2 of transformer 9→contact 5-1→contact 16-5→control line terminal 64→diode 59→capacitor 62→hook switch contact 46→primary winding of transformer 52→control line terminal 65→fixed resistor 11→ground E], and the alternating current is induced in the secondary winding of the transformer 52 to unmute the speaker 53.

(2) Answering to the incoming signal and talking operation

Upon reception of an incoming signal, the light emitting diode 41 is actuated by the operation described above and a calling tone is radiated by the speaker 53. The transistor 42, the fixed resistors 43 and 44 and the diode 45 form a constant-current circuit to ensure that a constant current flows in the light emitting diode 41 at this time. In this state, the operation level of a circuit composed of the constant-voltage diode 13 and the diode 12 is set so that when a current of a value sufficiently larger than required has flowed in the constant-current circuit, the base current of the transistor 15 can be flowed, while it is impossible to flow the base current of the transistor 15 by a voltage drop across the fixed resistor 11 caused by a current flowing in the abovesaid constant-current circuit (which is designed in taking into account the number of key telephone sets connected in parallel. Namely, the transistor 15, the fixed resistors 14 and 11, the constant-voltage diode 13 and the diode 12 make up a current detector which operates with a current exceeding a certain level.

Next, upon OFF-hooking the handset of the called key telephone set after pressing the CO line selecting interlocking key, a current flows in the base-emitter path of the transistor 15 via a route [power source⊕→secondary winding 9-2 of transformer 9→contact 5-1→contact 16-5→terminal 64→contact 47-1→contact 46-1→constant-voltage diode 48→contact 51-1→terminal 65→fixed resistor 11→ground E (the mid point of the power sources⊕⊖)]. On the other hand, a direct current flows via a route [power source⊕→secondary winding 9-2 of transformer 9→contact 5-1→contact 16-5→terminal 64→contact 47-1→contact 46-1→constant-voltage diode 48→contact 51-1→terminal 65→diode 12→constant-voltage diode 13→fixed resistor 14→base-emitter path of transistor 15→ground E], thus turning-ON the transistor 15 at the collector-emitter path. As a result of this, a direct current flows in the primary winding I of the relay 10 via a route [power source⊕→primary winding of relay 10→collector-emitter path of transistor 15→ground E] to actuate the relay 10. Upon actuation of the relay 10, a direct current flows in the winding of the relay 16 via a route [power source⊕→contact 10-1 of relay 10→winding of relay 16→ground E] to actuate the relay 16. The capacitor 16 and the fixed resistor 18 serve to delay release of the relay 16. By the operation of the relay 16, the contact 16-5 is changed over to cut off the incoming signal loop from the secondary winding 9-2 of the transformer 9 and, instead, flows a direct current via a route [power source⊕→contact 16-5→(the subsequent route is the same as that in the case of answering)] and, at the same time, stop sending out of the incoming signal to the key telephone set. Further, since the route actuating the relay 5 is cut off by the break of the contact 16-3, the relay 5 is released. Accordingly, the contact 5-2 is opened, so that the output from the multi-vibrator 7 is not applied to the oscillator 8 to derive therefrom no output.

At this time, the constant-voltage diode 48 is usually preferred to be one which is set at a sufficiently small value, (about ½ the power source voltage), as compared with the power source voltage ⊕, and even if a voltage fluctuation occurs, the diode current flowing in the light emitting diode 4 is held constant by the constant-current circuit. This prevents fluctuations in the brightness of the light emitting diode 4 during reception of the incoming signal, answering and talking operation. By the actuation of the relay 16, its contacts 16-1 and 16-2 are changed over to connect the talking circuit 56 to the CO line via a route [terminal 57→contact 16-1→one conductor of talking line 70→hook switch contact 46-3→talking circuit 56→key contact 54→the other conductor of talking line 70→contact 16-2→terminal 58], thus permitting the talking operation.

(3) Calling for the CO line

The above has described the operations in the case of an incoming signal having been received, but the following description will be given in connection with the case of calling for the CO line. During waiting where neither reception nor calling takes place), a power source voltage of the minus polarity appears at the terminal 64 via a route [power source⊖→contact 23-3→contact 33-1→contact 5-1→contact 16-5→terminal 64]. At this time, however, since the diode 59 and the contacts 47-1 and 46-1 are in the OFF state, no current flows across the terminals 64 and 65. If now the handset of the key telephone set 2 is OFF-hooked, the hook switch contact 43-1 makes and, when a CO line selecting key (not shown) is pushed, its contact 47-1 makes to flow a current to the secondary winding II of the relay 10 via a route [ground E→secondary winding II of relay 10→diode 38→terminal 65→contact 51-1→constant-voltage diode 48→contact 46-1→contact 47-1→terminal 64→contact 16-5→contact 5-1→contact 33-1→contact 23-3→power source⊖], actuating the relay 10. Upon actuation of the relay 10, its contact 10-1 is changed over to actuate the relay 16. Thereafter, the same operations as those in the case of answering to the incoming signal take place to connect the key telephone set to the CO line to make the talking operation possible.

The above embodiment has been described in connection with the case where the key service unit 1 and the key telephone sets 2 and 3 are provided separately, but it is also possible, of course, to form, for example, the key service unit 1 and the key telephone set 2 as a unitary structure with each other and the key telephone set 3 separately thereof just like a party line telephone.

Next, an intercom, talking operation will be described. In the conventional key telephone system, an intercomm. calling requires the counting of dial pulses or the use of an exclusive line for calling, and hence involves an expensive dial counter and extra cable lines for the exclusive use of calling. This increases the cost of the conventional key telephone system.

With the present invention, it is possible to achieve an intercomm. calling by pushing a button and an intercomm. talking operation without employing such extra cable lines and dial counting.

In FIG. 1, in the case of performing the intercomm. calling operation, a ringing signal for actuating the speaker is sent out from the key service unit 1 to the key telephone sets 2 and 3 through the control lines 70. For informing the sending out of the above-mentioned ringing signal from the key telephone sets 2 and 3 to the key service unit 1, the talking line 71 are used. The contact 54 is used for inserting the resistor 55 across conductors of the talking line 71 in series with the talking circuit 56 during the intercomm. calling. The capacitor 62, the contact 46-2, the transformer 52 and the speaker 53 make up a speaker circuit. The fixed resistors 26 and 28, the constant-voltage diode 27, the transistor 29 and the relay 30 constitute a fourth current detector, as will be described later. Also, the fixed resistors 26 and 31, the transistor 32 and the relay 33 form a fifth current detector, as will be described later.

In the case of calling the key telephone set 3 from the telephone set 2, when the handset of the latter has been OFF-hooked, the hook switch contact 46-3 makes to apply a direct current to the talking circuit 56 via a route [power source⊕→winding (middle) of transformer 25→contact 16-2→one conductor of talking line 71→contact 54 of the key for intercomm. calling→talking circuit 56→contact of hook switch 46-3→the other conductor of talking line 71→contact 16-1→winding (right side) of transformer 25→fixed resistor 26→ground E], enabling the talking operation. The circuit formed by the diode 27, the fixed resistor 28, the transistor 29 and the relay 30, and the circuit formed by the fixed resistor 31, the transistor 32 and the relay 33, both connected to the fixed resistor 26, are respectively the aforesaid fourth current detector and the fifth detector. The fourth detector is set at such an operation point that it operates when the direct current supplied via the abovesaid route exceeds a value which does not hinder the talking operation, for instance, when a current larger than 20 mA flows in the talking circuit 56, i.e. the talking line 71. Also, the fifth detector is set at such an operation point that it operates when the fixed resistor 55 is connected in series to the abovesaid route and the current flowing in the talking circuit 56 is sufficiently smaller than the abovesaid value, for example, larger than 5 mA.

Now, upon actuation of a calling key of the key telephone set 2, the contact 54 breaks to insert the series resistor 55 in the abovesaid loop, causing an abrupt decrease in the current flowing in the loop. As a result of this, the fourth detector is rendered inoperative to release the relay 30. However, since the fifth detector still remains operative, the output signal from the oscillator 8 is applied through the following route to the speaker 53 to unmute it. At first, the output signal current from the oscillator 8 flows via a loop [output terminal of oscillator 8→change-over terminal T→change-over terminal O→primary side of transformer 36→ground E] to excite the transformer 36 to induce a signal in its secondary winding. Next, the current of the signal thus induced flows via a loop [secondary winding of transformer 36 →contact 30-1 of relay 30→contact 33-1 of relay 33→contact 5-1 of relay 5→contact 16-5 of relay 16→terminal 64→diode 59→capacitor 62→hook switch contact 46-2→transformer 52→terminal 65→fixed resistor 11→ground E→ power source 60] to excite the transformer 52 to induce a signal in its secondary winding, unmuting the speaker 53 of the key telephone set 3. At this time, the speaker of the key telephone set 2 is made off with the hook switch contact 46-2.

In the excitation of the speaker 53, the impedance of the transistor 42 is raised by applying thereto a DC bias via a route [power source⊕→secondary winding of transistor 36→contact 30-1→contact 33-1→contact 5-1→contact 16-5→terminal 64→diode 59→light emitting diode 41→collector-emitter path of transistor 42→fixed resistor 43→terminal 65→fixed resistor 11→ground E→power source 60]. It is also possible to insert a coil or a like inductive element in series to the transistor 42 in lieu of applying the DC bias to the transistor 42.

When the handset of the key telephone set 3 is OFF-hooked in the above state, i.e. in the calling state, the talking circuit 56 of the key telephone set 2 (in which the series resistor 55 is inserted to provide a high resistance value in this case) and the talking circuit 56 of the key telephone set 3 (in which no resistor is inserted to provide a low resistance value in this case) are connected in parallel with each other via the abovesaid loop, and their composite resistance is low, so that the current flowing in the talking line 71 increases to actuate the relay 30. As a result of this, the contact 30-1 is changed over to the break state and the loop of the ringing signal exciting the speaker 53 is thereby cut off to stop ringing.

Further, the same operations as those described above are achieved to stop the calling not only when the called key telephone set has answered as referred to above but also when the calling key telephone set has abandoned the calling, that is, when the contact 54 has made.

Moreover, when the handset of the calling key telephone set has been ON-hooked, the aforesaid calling route is cut off by the contact 33-1 to stop the calling.

The above is the operation of the intercomm. calling. In the case of performing intercomm. talking operation between the key telephone sets 2 and 3 interconnected as described above, a direct current is supplied to the talking circuits 56 of the key telephone sets 2 and 3 via a route [power source⊕→winding (middle) of transformer 25→contact 16-2→one conductor of talking line 71→contact 54 of key telephone set 2→talking circuit 56 of key telephone set 2→hook switch 46-3 of key telephone set 2→the other conductor of talking line 71→contact 16-1→winding (right) of transformer 25→fixed resistor 26→ground E] and a route [power source⊕→winding (middle) of transformer 25→contact 16-2→one conductor of talking line 71→contact 54 of key telephone set 3→talking circuit 56 of key telephone set 3→hook switch 46-3 of key telephone set 3→the other conductor of talking line 71→contact 16-1→winding (right) of transformer 25→fixed resistor 26→ground E], thus making intercomm. talking operation possible.

The above has described the intercomm. calling in connection with the tone calling, but this invention also enables the voice calling, which will hereinbelow be described. The change-over bar 35 is switched to interconnect between the terminals O and V to connect the output from the amplifier 34 to the primary winding of the transformer 36. Further, the input to the amplifier 34 is connected to the winding (left) of the transformer 25 to flow a voice signal current from the talking circuit 56 in the same loop as the aforementioned loop for the DC supply to the talking circuit 56. The voice signal current is induced in the winding (left) of the transformer 25 and applied to the amplifier 34, the output from which is applied to the speaker 53 through the transformer 36 and via the same route as the tone signal sending out route, thus enabling the voice calling.

Next, a description will be given of the holding circuit of the key telephone system of this invention and its operation.

In the key telephone set 2 or 3, the capacitors 49 and 50 form a capacitor circuit in which the capacitors can be switched from the parallel connection to the series connection by the operations of the contacts 51-1 and 51-2 which are caused by the actuation of the CO line holding key. This capacitor circuit is connected in series with the contact 47-1 of the CO line selecting key. In the key service unit 1, the resistors 11 and 14, the diode 12, the constant-voltage diode 13, the transistor 15 and the primary winding I of the relay 10 constitute the aforementioned second current detector for detecting a state where a current of a value sufficiently larger than a predetermined current value has flowed through the control lines 70. The diode 19, the resistor 20, the transistor 21 and the resistor 63 from a sixth current detector which operates when a current of a value sufficiently smaller than the above predetermined current value has flowed through the control lines 70. The relay 16 is a first relay having a slow release characteristic which is operated by the contact 10-1 serving as the output of the abovesaid second current detector. The relay 23 is a second relay having a self-holding circuit which operates only when a current, which is less than the operation levels of the second detector and the sixth detector during the operation of the first relay 16, is applied to the control lines 70. Further, in the key telephone set 2 or 3, the contacts 51-1, 51-2, 46-1 and 47-1 are used as means for applying across the control lines 70 the sum of charged voltages of the capacitors 49 and 50 in the form of a voltage higher than that applied from the key service unit 1 in response to the operation of the first relay 16. With such an construction, the second detector and the sixth detector are simultaneously released by the operation of the CO line holding key to actuate the second relay 23.

At first, the charging and discharging operations in the holding system of this invention will be described. During the talking operation, the capacitor 49 connected in parallel with the constant-voltate diode 48 and the capacitor 50 also connected in parallel with the diode 48 through the contacts 51-1 and 51-2 are respectively charged, by a voltage drop across the constant-voltage diode 48 which is caused by the formation of a DC loop in the control lines 70.

Then, upon depression of the CO line holding key 51, the contacts 51-1 and 51-2 are changed over and, at this time, voltages stored in the capacitors 49 and 50 are applied across the terminals 64 and 65 via a route [terminal 64→contact 47-1 of CO line selecting key→hook switch contact 46-1→capacitor 49→contact 51-2→capacitor 50→terminal 60]. The operaton voltage level of the constant-voltage diode 48 is set at a value a little larger than half the voltage of the power source ⊕. For example, if the power source ⊕ has a voltage of 24 volts, the terminal voltage of the constant-voltage diode 48 is set to be 13 volts. In such a case, a voltage of 26 volts is instantly applied across the terminals 64 and 65. This implies that a negative voltage polarities are applied across the fixed resistor 11.

Next, the operation of holding the CO line will be described. If, now, the key 51 prepared for holding the CO line is pushed, the fixed resistor 11 is negative biased by the above charge and discharge operations and, as a results of this, the base current of the transistor 15 is cut off, and accordingly its collector current is also cut off, releasing the relay 10. On the other hand, since the fixed resistor 11 is negative-biased, the collector current of the transistor 22 is also cut off, because the base current of the transistor 21 is turned-OFF at the collector-emitter path. As a result of this, the base current of the transistor 22 is supplied from the power source ⊕ through the fixed resistor 63 to turn ON the transistor 22 at the collector-emitter path. At this time, the relay 10 is released and the relay 16 is adapted to be released late with the capacitor 17, so that when the transistor 22 is turned ON and the relay 10 is released, a current flows in the relay 23 via a route [power source ⊕→contact 10-1 of relay 10→relay 23→collector-emitter path of transistor 22→contact 16-4 of relay 16→ground E] to actuate the relay 23. The operation of the relay 23 is self-held by its contact 23-1 and, the terminals 57 and 58, between which the CO line has been connected, are interconnected via a route [terminal 57→fixed resistor 24→contact 23-2 of relay 23→terminal 58]. After a certain period of time from releasing the relay 10, the relay 16 is released and its contacts 16-1 and 16-2 are changed over to disconnect the talking circuit 56 of the key telephone set 2 from the CO line. The state of the key service unit 1 is the same as that during the waiting condition except that the relay 23 is actuated. Accordingly, the key telephone set 2 can be released from its holding state to seize the CO line again by the same operation as that for the calling. At this time, the relay 10 operates and the route [power source ⊕→contact 10-1→relay 23→contact 23-1→earth E], which is the self-holding route of the relay 23, is interrupted by switching of the contact 10-1, thus releasing the relay 23.

The above is the operation of the holding circuit. For the completion of this circuit operation, the following conditions are needed.

(a) The keys 47 and 51 are required to fulfil the following conditions: (1) The key 47 is a lock-typed key, which is released when the key 51 is released after being depressed. (2) Accordingly, the contact 47-1 remains in the ON state while the key 51 lies in its depressed position and, at this time, the contacts 51-1 and 51-2 of the key 51 are changed over. (3) Upon releasing the key 51, the key 47 is also released and the contact 47-1 is also turned OFF. Since this structure has already been employed in many key telephone sets and is well-known, detailed description is omitted.

(b) The relay 10 and the transistor 22 are required to be released more rapidly than the relay 16.

(c) The operation current level $I_c$ of the relay 10, which flows in the control lines 70 from the power source + is set in the range given by the following formula:

$$I_H < N.I_O < I_c < I_L$$

where $I_O$ is required current between the terminals 64 and 65 when the power source ⊕ is connected to the terminal 64 while the contacts 47-1 and 46-1 are in the OFF state; $I_L$ is a required current flowing across the terminals 64 and 65 when the power source ⊕ is connected to the terminal 65 while the contacts 47-1 and 46-1 are in the ON state; N is the number of key telephone sets connected; and $I_H$ is the level of an operation current flowing in the control lines 70 when turning ON and OFF the transistor 22.

Figure 2:
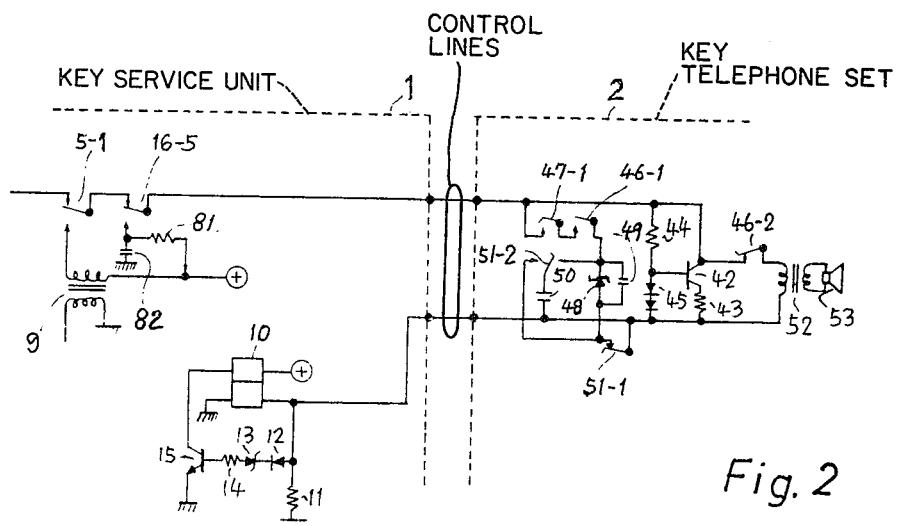
FIGS. 2 and 3A are circuit diagrams each illustrating a modification of a part of the embodiment shown in FIG. 1 for performing the intercomm. talking operation.
Figure 3A:
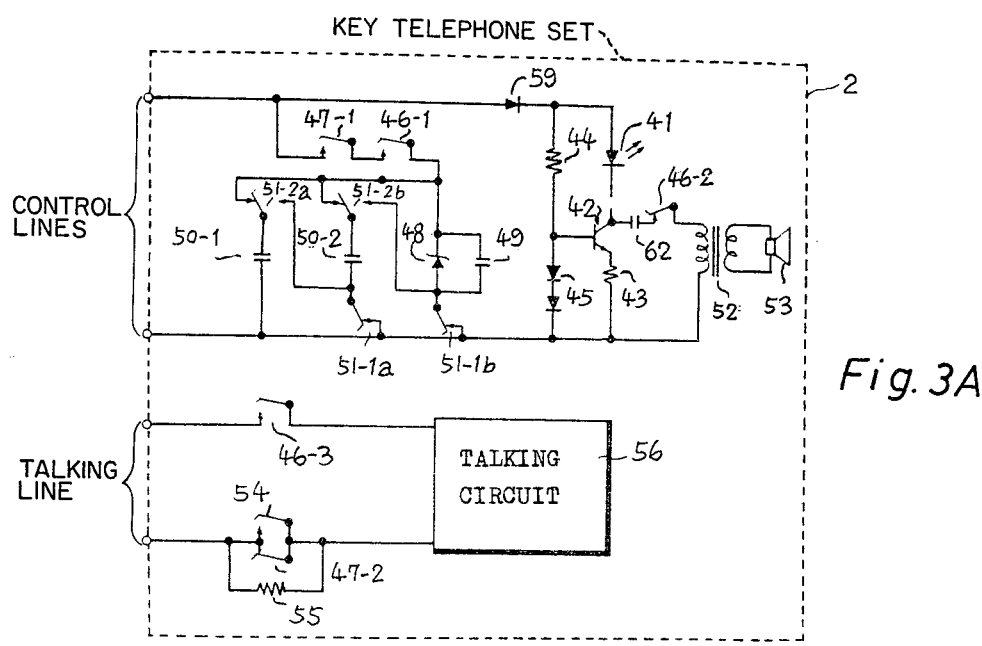

FIGS. 2 and 3A show examples of a circuit by which the value of a voltage supplied from the key telephone set 2 or 3 upon actuation of the holding key is sufficiently larger than the value of the voltage applied from the key service unit 1 to the control lines 70 at that time, thereby to more stabilize the operation of the holding circuit.

In FIG. 2, a circuit composed of a fixed resistor 81 and a capacitor 82 is added to the circuit of FIG. 1, by which the power source voltage ⊕ including a voltage drop produced across the fixed resistor 81 by the loop current flowing in the switched contact 16-5 is charged in the capacitor 82. In other words, the terminal voltage of the capacitor 82 is lower than the power source voltage ⊕ by the voltage drop across the fixed resistor 81. Upon changing over the contacts 51-1 and 51-2 in the above state, a voltage applied from the key telephone set to the detectors increases by the voltage drop, as compared with that in the case of FIG. 1, thus ensuring the operation of the detectors.

In FIG. 2, detection is stabilized by dropping the voltage applied from the key service unit 1, but in FIG. 3A, the voltage supplied from the key telephone set 2 or 3 is raised to obtain the same result. FIG. 3A illustrates the construction in which the number of capacitors is increased as indicated by 50-1 and 50-2 and the parallel or series switching control is achieved by controls 51-1a, 51-1b, 51-2a and 51-2b, although the example of FIG. 1 achieves voltage generation by the capacitors 49 and 50. In this case, three capacitors are used but four or more capacitors may also be employed. Further, it is also possible, of course, to employ the construction of FIGS. 2 and 3A in combination with each other.

In the key telephone set (2, 3) shown in FIGS. 1 and 3A, if the electric charge stored in the capacitors 49, 50 (or 49, 50-1, 50-2) is discharged to the normal DC voltage across the control lines 70, a DC charge current of the above capacitors may be flowed through the control lines 70 from the key service unit 1 so that the relay 10-II will be erroneously actuated.

Figure 3B:
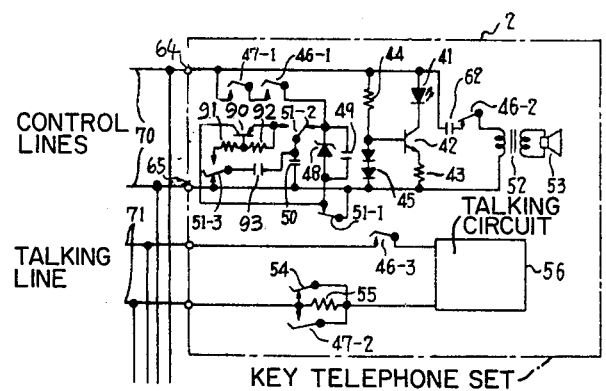
FIG. 3B is a circuit diagram illustrating a modification of an example shown in FIG. 3A.

To avoid the above defect, the key telephone set (2, 3) may have as shown in FIG. 3B disconnection means (90, 91, 92, 93, 51-3) for disconnecting the above capacitors (49, 50) from the control lines 70 before discharging the charge of the above capacitors 49, 50 to the normal DC voltage across the control lines 70 when the CO line holding key (51) is operated. In this case, the contact 51-3 is an additional contact of the CO line holding key; 90 a transistor; 91, 92 fixed resistors; and 93 a capacitor. The transistor 90, the fixed resistors 91, 92 and the capacitor 93 form a time-limited switch circuit turning-ON by a predetermined short time in response to the operation of the CO line holding key (51).

In operation, when the CO line holding key (51) is depressed, the base current of the transistor 90 flows by the charge voltage of the capacitor 93 through a rout [right side terminal of capacitor 93→contact 51-2→emitter-base path of the transistor 90→fixed resistor 91→contact 51-3→left side terminal of capacitor 93], so that the collector-emitter path of the transistor 90 is turned-ON only within the duration of the discharge current of the capacitor 93. Accordingly, the charged voltage of the capacitors 49 and 50 is applied across terminals 63 and 65 through a rout [terminal 64→contact 47-1 of CO line selecting key→contact 46-1 of hook switch→capacitor 49→collector-emitter path of transistor 90→contact 51-2→capacitor 50→terminal 65]. The ON-time of the collector-emitter path of the transistor 90 is determined to be shorter than the release time of the relay 16 but longer than the operating time of the relay 23. As mentioned above, the above time limited switch circuit employed to cut-off the collector-emitter path of the transistor 90 when the negative voltage and the positive voltage are respectively applied to the terminals 64 and 65 in response to restoration of the relay 16, and to avoid actuation of the relay 10 to cut-off a rout [ground E→winding II of relay 10→diode 38→terminal 65→capacitor 50→contact 51-2→collector-emitter path of transistor 90→constant-voltage diode 48→contact 46-1→contact 47-1→terminal 64→contact 16-5→contact 5-1→contact 33-1→contact 23-3→DC source ⊖] by cutting-off the collector-emitter path of the transistor 90.

Figure 4:
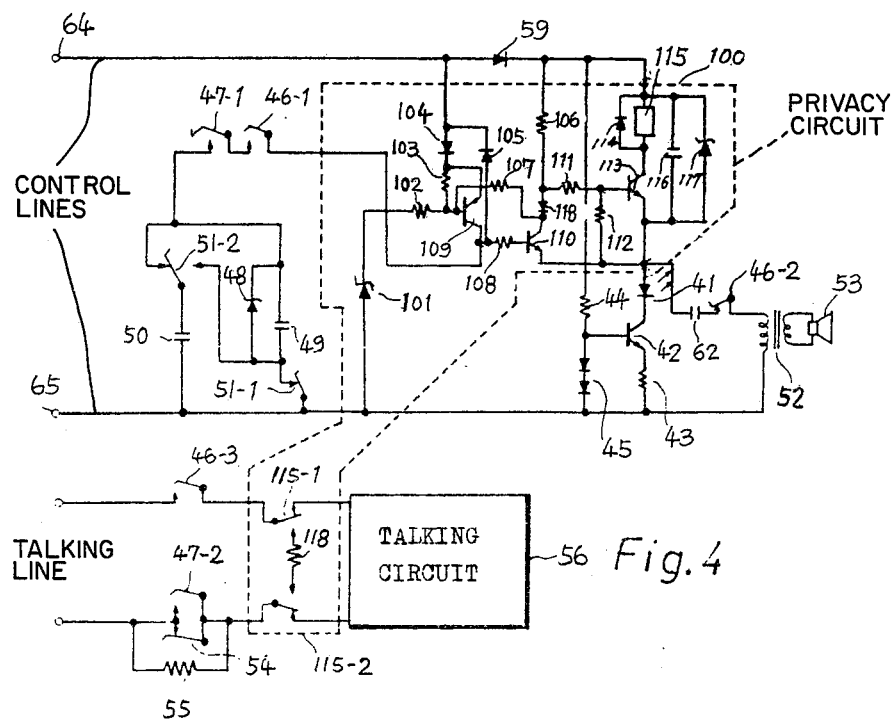
FIGS. 4, 5, 6, 7 and 8 are circuit diagrams each illustrating a privacy circuit employed in this invention.

FIG. 4 shows a privacy circuit 100 which is additionally used as one part of the circuit of FIG. 1. In FIG. 4, the power source input section of the privacy circuit 100 (the cathod side of a diode 114 and the emitter of a transistor 113) is connected in series to the current limiter including the light emitting diode 41, the transistor 42, the resistors 43 and 44 and the diode 45 used in FIG. 1, and is connected in parallel to the control signal input terminals 64 and 65 in a manner to be supplied with the power from the power source input section for the detection of privacy information. In FIG. 4, reference numerals 101 and 107 indicate constant-voltage diodes; 102, 103, 106, 107, 108, 111 and 112 designate fixed resistors; 104, 105, 114 and 118 identify diodes; 109, 110 and 113 denote transistors; 115 represents a relay; and 116 shows a capacitor. The operation of the circuit shown in FIG. 4 will be described below.

When one of a plurality of key telephone sets 2,3 connected in parallel to each other has actuated by the CO line selecting key 47 for reception or calling after OFF-hooking the handset, a voltage (of a value obtained when the voltage drop produced across the fixed resistor 11 by a current flowing in the current limiter is substracted from the power source voltage), which is substantially equal to the voltage of the power source 60, is applied across the terminals 64 and 65 at such a polarity to make the terminal 64 positive relative to the terminal 65. In this case, the operation level of the constant-voltage diode 101 is set to be lower than the voltage applied at this time but higher than the operation level of the constant-voltage diode 48. Thus, the constant-voltage diode 48 has an operation voltage level lower than the voltage of the aforesaid power source input part which is set by the diode 101, and this constant-voltage diode 48 is connected to the control lines 70 through the privacy circuit 100 in series to the contact 47-1 of the CO line selecting key and the hook switch contact 46-1.

The operation of the privacy circuit 100 starts with flowing of the base current of the transistor 109 via a route [terminal 64→diode 104→emitter-base path of transistor 109→fixed resistor 102→constant-voltage diode 101→terminal 65] to turn ON the transistor 109 at the collector-emitter path. Next, the base current of the transistor 101 flows through the base-emitter path via a route (terminal 64→diode 104→emitter-collector path of transistor 109→fixed resistor 108→base-emitter path of transistor 110→light emitting diode 41→collector-emitter path of transistor 42→fixed resistor 43→terminal 65], turning ON the transistor 110 at the collector-emitter path. Since a circuit formed by the transistors 109 and 110 constitutes a flip-flop, this state is maintained unchanged, even if the voltage across the terminals 64 and 65 becomes lower than the operation level of the constant-voltage diode 101 in this state.

The base current supplied to the base of the transistor 113 through the fixed resistors 106 and 111 is by-passed through the collector-emitter path of the transistor 110, and accordingly the base current is cut-off, holding the transistor 113 in the OFF state at the collector-emitter path and the relay 115 in the restored state. Consequently, the contacts 115-1 and 115-2 are held in the state shown in FIG. 4 and, in this case, the talking operation is possible.

By turning ON the transistor 109 at the collector-emitter path, the control lines 70 are terminated via a route [terminal 64→diode 104→emitter-collector path of transistor 109→contact 46-1→contact 47-1→constant-voltage diode 48→contact 51-1→terminal 65], dropping the voltage across the terminals 64 and 65 close to the operation voltage of the constant-voltage diode 48.

Next, a description will be made in connection with the case where one of the other key telephone sets 2 and 3 connected in parallel to the above one has been operated to effect the calling for the CO line in the above state. At this time, the privacy circuit 100 of this key telephone set, that is, the relay 115, operates to render the talking operation impossible. This operation is as follows: At this time, since the voltage across the terminals 64 and 65 of the key telephone set is lower than the voltage of the constant-voltage diode 101, the above-mentioned route for flowing the base current of the transistor 109 is blocked by the constant-voltage voltage diode 101, and accordingly the transistor 109 is held in the OFF state at the collector-emitter path. As a result of this, the transistor 110 is held in the OFF state at the collector-emitter path and a current is supplied to the base of the transistor 113 via a route [terminal 64→diode 59→fixed resistor 106→fixed resistor 111→base-emitter path of transistor 113→light emitting diode 41→collector-emitter path of transistor 42→fixed resistor 43→terminal 65], by which the transistor 113 is turned ON at the collector-emitter path to actuate the relay 115. Accordingly, the contacts 115-1 and 115-2 are changed over to disconnect the talking circuit 56 from the talking line, making the talking operation impossible, that is, performing the privacy function.

With the above operation, only the key telephone set which has effected the calling for the CO line earlier than the other is permitted of the talking operation, and interruption in the communication path is prevented. Thus, a so-called privacy function is performed.

As described above, the privacy circuit of FIG. 4 employs a cable having four insulated conductors, which is a very small number as compared with that used in the conventional system, performs the functions of the key telephone system and, at the same time, fulfils its function, i.e. the privacy function. This enables the privacy function which is difficult to obtain with such a system, and hence enhances the practical utility of the overall system.

Figure 5:
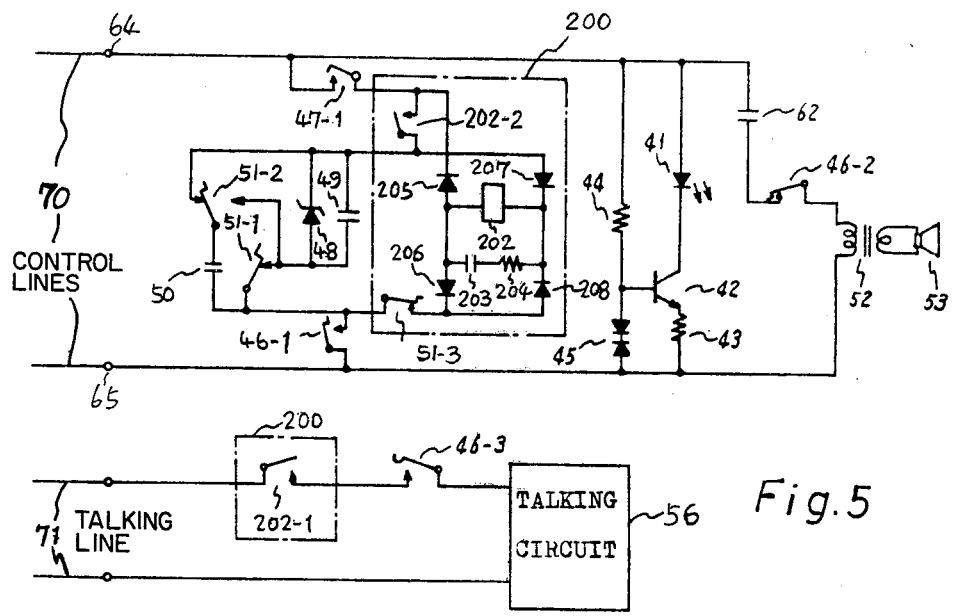
Figure 6:
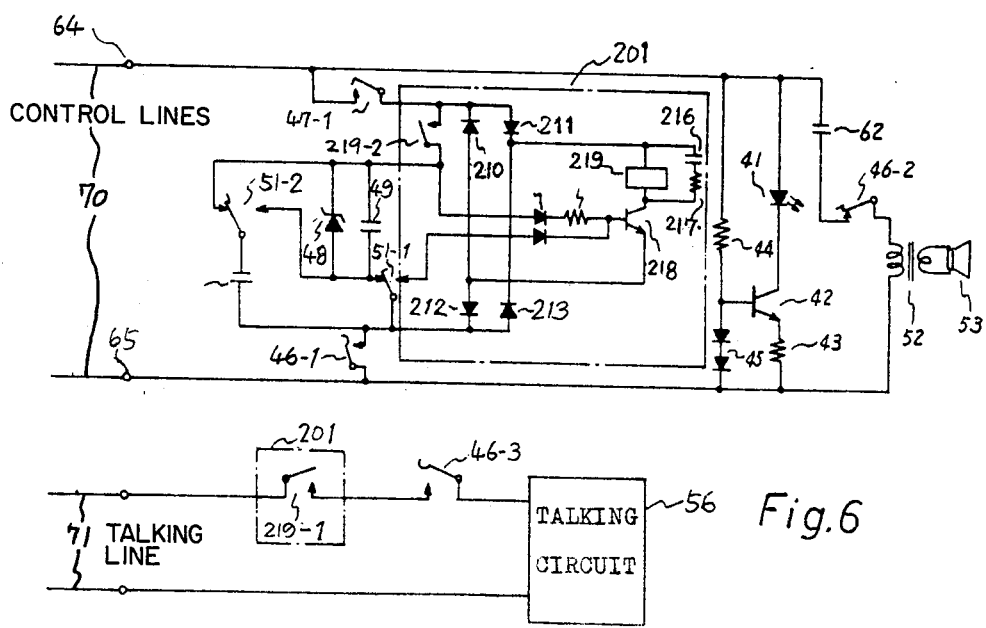

Turning now to FIGS. 5 and 6, other privacy systems of this invention will be described in detail.

FIG. 5 illustrates another embodiment of the privacy circuit provided at the side of the key telephone set according to the system of this invention. By inserting the circuit of FIG. 5 in place of the key telephone sets 2 and 3 shown in FIG. 1, the privacy function can be obtained between the key telephone sets 2 and 3. In FIG. 5, the one-dot chain line block indicates a privacy circuit 200. Reference numeral 202 designates a relay; 202-1 and 202-2 identify contacts of the relay 202; 205, 206, 207 and 208 denote diodes; 203 represents a capacitor; 204 shows a resistor; and 51-3 refers to a contact which is ganged with the contacts 51-1 and 51-2 of the CO line holding interlock key. The other parts are the same as those in the circuit of FIG. 1.

The operation of this embodiment is as follows:

In case of a calling when the CO line is idle, since the control line terminals 64 and 65 are repsectively equipotential to the power source ⊖ and the ground as described previously with regard to FIG. 1, a current flows in the key telephone via a route [ground→control line terminal 65→hook switch contact 46-1→contact 51-3 of CO line holding key→diode 208→relay 202→diode 205→contact 47-1 of CO line selecting key→control line terminal 64→power source ⊖], by which the relay 202 is actuated to close the contact 202-1 and the talking circuit 56 is connected to the CO line through the hook switch contact 46-3 and the talking line 71, performing the CO line seizing operation. At the same time, the terminal 64 of the control lines 70 is reversed in polarity to be positive while the terminal 65 of the control lines 70 become equipotential to the ground as described previously in (3) calling, so that a current flows in the above-mentioned route in the reverse direction to the above. However since the contact 202-2 of the relay 202 is closed, a loop is formed through the diodes 207 and 206 so that the voltage across the constant-voltage diode is applied to the relay 202 to maintain it the actuated state.

In the manner described above, at the side of the key telephone set (for example, 2) having first used the CO line, the relay 202 of the privacy circuit 200 is actuated to form a talking loop. In such a state, even if a key telephone set (3 connected in parallel to the key telephone set 2) tries to interrupt in the CO line by pressing the CO line selecting key and OFF-hooking the handset to actuate the contacts 47-1, 46-1 and 46-3, since the control line terminals 64 and 65 are already equipotential to the power source ⊕ and the ground, respectively, the operation loop of the relay 102 is not formed. That is, in the key telephone set 3, since the contact 202-2 of the relay 202, which forms a part of the operation loop when the terminal 64 of the control line 70 is equipotential to the power source ⊕, is open, the relay 202 is not actuated. Consequently, interruption of the talking loop is impossible and the privacy function is performed for the key telephone set 2 having first used the CO line.

The contact 51-3 of the CO line holding key is a contact for disconnecting the privacy circuit 200 to avoid attenuation of a holding signal which is applied through the privacy circuit 200 connected in parallel to the multivibrator (i.e. a holding signal sensing circuit) 37 shown in FIG. 1, when the holding operation is achieved after activating the holding circuit. The capacitor 203 and the resistor 204 make up a delay circuit which holds the contact 202-1 to delay releasing of the relay 202 for forming the holding loop until the holding operation has been completely performed.

FIG. 6 similarly shows another embodiment of the privacy, circuit which is provided at the side of the key telephone set of the system of this invention. By inserting the privacy circuit of FIG. 6 in place of the key telephone sets 2 and 3 shown in FIG. 1, the privacy function can be obtained. In FIG. 6, the one-dot-chain line block indicates generally a privacy circuit 201. Reference numerals 210, 211, 212, 213 and 214 designate diodes; 215 and 217 identify resistors; 216 denotes a capacitor; 218 represents a transistor; 219 shows a relay; and 219-1 and 219-2 refer to contacts of the relay 219. The other parts are the same as those in the circuit of FIG. 5.

The operation of this embodiment is as follows:

Upon OFF-hooking the handset after pushing the CO line selecting key when the CO line is idle, the following two routes are formed: [ground→control line terminal 65→hook switch contact 46-1→contact 51-1 of CO line holding key→constant-voltage diode 48→diode 214→resistor 215→base-emitter path of transistor 218→diode 210→contact 47-1 of CO line terminal key→control line 64→power source ⊖] and [ground-→control line terminal 65→hook switch contact 46-1 diode 213→relay 219→collector-emitter path of transistor 218→diode 210→contact 47-1 of CO line selecting key→control line terminal 64→power source ⊖]. With the above routes, the transistor 218 is turned ON and the relay 219 operates through the latter route.

Accordingly, there is also formed a loop in which the contact 219-2 of the relay 219 is closed, and, further, the contact 219-1 is closed to achieve the CO line seizing operation and the control line terminals 64 and 65 become equipotential to the power source ⊕ and the ground, respectively. As a result of this, the voltage of the constant-voltage diode 48 is applied to the base of the transistor 218 through the diode 214 and the resistor 215 to keep the transistor 218 in the ON state, actuating the relay 219.

Thus, when the CO line is already occupied, even if a key telephone set (for example, 3 connected in parallel to the key telephone set 2), which intends to use the CO line, tries to interrupt in the CO line by pressing the CO line selecting the key and then OFF-hooking the handset to actuate the contacts 47-1, 46-1 and 46-3, the operation loop of the relay 202 is not formed since the control line terminals 64 and 65 are already equipotential to the power source ⊕ and the ground, respectively. That is, in the key telephone set 3, the contact 219-2 of the relay 219, which forms a part of the operation loop when the control line is equipotential to the power source ⊕, is open, so that the base-emitter path of the transistor 218 are both equipotential to the ground, and the transistor 218 does not operate. In consequence, the relay 219 is not actuated, an interruption of the talking operation is impossible so that the privacy function is provided.

At the start of the holding circuit, the potential of the emitter of the transistor 218 is equal to the potential of the base side with the formation of a short circuit by the contact 5-1 through the diode 215, so that the transistor 218 is turned OFF and the relay 219 is also released, and consequently no privacy loop is formed. As described previously with reference to FIG. 5, the capacitor 216 and the resistor 217 serve as a delay circuit which is connected in parallel to the relay 219 so that when the privacy circuit 201 is disconnected by the holding operation, the holding loop may be held by the contact 219-2 until the loop is completely formed.

In the embodiments of FIGS. 5 and 6, it is possible to employ the construction in which the circuit elements except the hook switch contacts 46-1, 46-2 and 46-3 and the talking circuit 56 are arranged together with the circuits of the key service unit. For example, the key service unit is seated in a telephone rest and the telephone set is put thereon.

As described abobe, the privacy circuits of FIGS. 5 and 6 utilize a pair of control line terminals 64 and 65 one of which is held at a reference potential (in the above embodiments, the ground E), and employ DC power sources (60 and 61) for producing two different output voltages (⊕ and ⊖) which are respectively higher and lower than the reference potential (E) by constant values. The privacy circuits are provided with control means (in the above embodiments, 10, 10-1, 11, 12, 13, 14, 15, 16, 16-5, 17, 18 and 38) for normally applying one of the output voltages from the DC power sources (in the above, ⊖)as the first state to the other control line terminal (64) and for applying the other output voltage (in the above, ⊕) as the second state when a DC loop has been formed by the CO line seizing operation between the control line terminals 64 and 65, and connecting means (in the above embodiment, 200 or 210) which actuates by a DC loop formed across the control line terminals 64 and 65 when the CO line seizing operation has been effected in the first state, to thereby connect the talking circuit 56 to the CO line terminals 57, 58, and holds the actuated condition even when the first state shifts to the second state, and does not actuate when the CO line seizing operation has been done in the second state, thereby to disable the operation of the key telephone set actuated to interrupt in the CO line when the CO line is already occupied, thus performing the privacy function.

As described above, this privacy system detects the polarities of the control lines and derives therefrom a current for operation, so that only one circuit operates for a calling in one system. Accordingly, since a current does not increase with an increase in the number of connected key telephone sets unlike in conventional circuits, the privacy detecting ability has no relation to the number of key telephone sets so that detection and operation are possible with two control lines.

As a privacy system for a key telephone system or the like, there has heretofore been employed such a circuit system in which privacy means provided in a privacy circuit is activated at the time of privacy operation to prevent a talking circuit from being connected to a communication loop so as not to cut it off. That is, in case of using a circuit system which actuates the privacy circuit only when the CO line is seized but does not actuate the privacy circuit at the time of privacy talking operation, the privacy circuit does not start during intercomm. talking operation and power source interruption so that there occurs such a trouble that no communication loop is formed. Therefore, it has been inevitable to adopt the system which actuates the privacy circuit at the time of privacy talking operation, as described above. This necessitates detection of the state of the control lines by the potential or the like in the case of effecting private talking operation, and involves compensation for an erroneous operation resulting from variations in the number of key telephone sets connected in parallel and from fluctuations in the power source voltage, and further, introduces complexity in the construction of the privacy circuit.

According to this invention, there can be provided a privacy system for key telephone system which is simple in circuit construction but is capable of the normal talking operation and the privacy operation during a power source interruption and an intercomm. talking communication.

Figure 7:
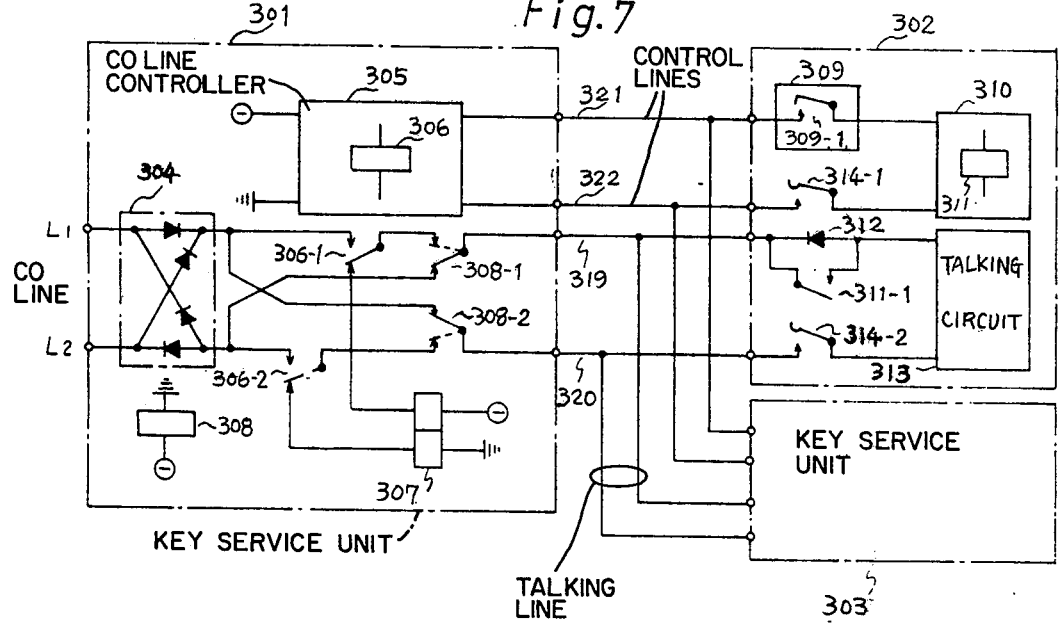
Figure 8:
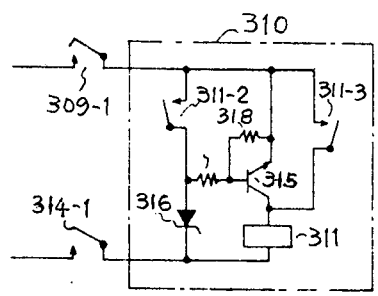

FIG. 7 shows an embodiment of such privacy system of this invention and FIG. 8 illustrates an example of the privacy circuit for such system. Reference numeral 301 indicates a key service unit; 302 and 303 designates key telephone sets of the same circuit construction; 304 identifies a rectifier; 305 denotes a CO line controller; 306, 307, 308 and 311 represent relays; 306-1, 306-2, 308-1, 308-2 and 311-1, 311-2 and 311-3 show contacts of the relays 306, 308 and 311, respectively; 309 refers to a CO line seizing part; 309-1 indicates a contact of a CO line selecting key; 310 designates a privacy circuit which operates at the time of seizing the CO line but does not operate during the power source interruption and the privacy talking operation; 312 identifies a diode; 313 denotes a talking circuit; 314-1 and 314-2 represent hook switch contacts; 315 shows a transistor; 316 refers to a constant-voltage diode; 317 and 318 indicate resistors; $L_1$ and $L_2$ designate conductor of a CO line; 319 and 320 identify conductors of a talking line; and 321 and 322 denote control lines.

The operation of the circuit will hereinbelow be described.

When the power source has been connected to the key telephone system, the relay 308 provided in the key service unit 301 actuates and maintains the actuated state while the power source is connected, so that the contacts 308-1 and 308-2 are usually held at the positions indicated by the broken lines.

If, now, the handset of the key telephone set (for instance, 302) is OFF-hooked to close the hook switch contacts 314-1 and 314-2 and then the CO line seizing part 309 is actuated, that is, the CO line selecting key in this example is depressed, to close the contact 309-1, the relay 306 included in the CO line controller in the key service unit 301 and the relay 311 in the privacy circuit 310 are actuated via the following route. If the voltage $E_1$ across the control lines 321 and 322 and the operation voltage $E_2$ of the constant-voltage diode 324 are set such that equal to the voltage $E_2$ set by the constant-voltage diode 316, and the relay 311 is held at this potential. Further, since the contact 311-1 is also closed, the following communication loop is formed to enable the talking operation:

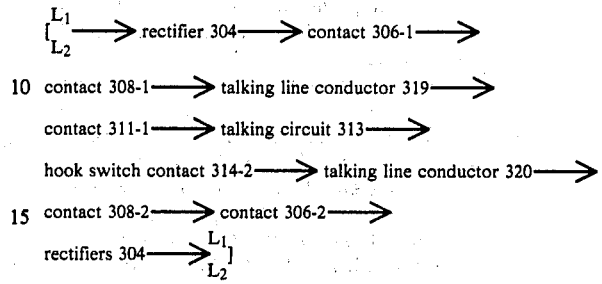

The above is the case of talking operation by the normal CO line seizing operation. The following will describe a case in which when the CO line is already seized by a key telephone set (for instance, 302), the other key telephone set (i.e. 303) is actuated to seize the CO line.

When the CO line is already seized by a key telephone set, the relay 306 operates, as described above, and the talking line 319 is made by the rectifier 304 equipotential to the power source ⊕ through the contacts 306-1 and 308-1 regardless of the polarity of the CO line terminals $L_1$ and $L_2$. Similarly, the talkling line terminal 320 is equipotential to the power source ⊖ through the contacts 306-2 and 308-2 and the voltage across the control lines 321 and 322 is already set at $E_2$, as described above.

Accordingly, in such a case, that is, even if the key telephone set (for example, 303), which is connected in parallel to the key telephone set (for example, 302) having already seized a CO line, interrupts in the CO line, the potential difference between the base and emitter of the transistor 315 in the privacy circuit 310 of the key telephone set (for instance, 303) becomes "zero" and the transistor 315 does not operate, so that the relay 311 is not actuated. As a result of this, the contact 311-1 is not closed so that the diode 312 is connected in series to the communication loop. At this time, the diode 312 has the reverse polarity from the talking line conductors 319 and 320, and hence is turned OFF to inhibit the passage therethrough of the talking voice current, disabling the talking operation (i.e. privacy operation).

Thus, with the above embodiment of the privacy circuit according to the system of this invention, the privacy circuit is rendered operative or inoperative by detecting the potential difference between the control lines 320 and 321. Moreover, the same operation can

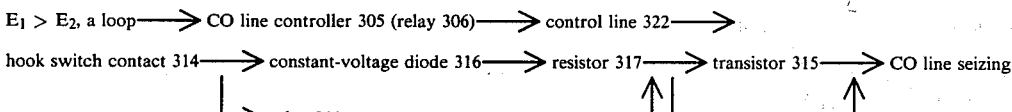

Consequently, the contacts 306-1 and 306-2 of the relay 306 are changed over and, at the same time, the contacts 311-2 and 311-3 of the relay 311 are closed, by which the voltage across the control lines 321 and 322 is made also be achieved by forming the voltage applied to the control lines 321 and 322 so that the polarity of the voltage may be reversed during waiting from that during communication, and by detecting the reversal of polarity by the privacy circuit 310. Further, other means may be employed for performing the same operation.

Next, a description will be given with regard to the case of intercomm. talking operation between the key telephone sets 302 and 303. In the case of achieving intercomm. talking operation, since the CO line selecting key 309-1 of the CO line seizing part 309 is not closed, the relay 306 of the CO line controller 305 and the relay 311 of the privacy circuit 310 are not activated. Accordingly, in connection with the talking circuit 313, the following intercomm. talking loop is formed through the relay 307 for the intercomm. current supply, thereby to achieve intercomm. talking operation between the parallel-connected key telephone sets.

[ground→relay 307→contact 306-2→contact 308-2→talking line conductor 320→hook switch contact 314-2→talking circuit 313→diode 312→talking line conductor 319→contact 308-1→contact 306-1→relay 307→power source ⊖]

The operation during the power supply interruption is as follows: During the power supply interruption, the relays 306 and 308 are not actuated, so that their contacts are in the restored states, and the polarity of the talking line conductor 319 is made negative by the rectifier 304 through the contact 308-1 and the talking line conductor 320 is made positive through the contact 308-2. As a result of this, a talking voice current flows in the diode 312 in the key telephone set to enable a call for the CO line during the power supply interruption. However, an intercomm. talking operations is made impossible because no line current is supplied.

In FIG. 7, the rectifier 304 is inserted in the CO line conductors $L_1$ and $L_2$, but if the polarities of the CO line conductors $L_1$ and $L_2$ are predetermined, the rectifier is unnecessary. Further, the CO line and the intercomm. talking line are shown to be common to them, but if separate communication lines are used, the contacts 306-1 and 306-2 can be eliminated. Moreover, the diode 312 can be replaced by another polarized element.

Moreover, it is possible to dispose to the key service unit the circuits of the key telephone set except the hook switch contacts 314-1 and 314-2 and the talking circuit 313.

Furthermore, the above example has been described with respect to the case where two key telephone sets are connected in parallel to each other, but more than two key telephone sets can be connected.

In accordance with the present invention, the key telephone system, in which the plurality of key telephone sets 302 and 303 are connected in parallel to each other through the control line conductors 321 and 322 and the talking lines 319 and 320 to the key service unit 301 connected to the CO line conductors $L_1$ and $L_2$, is provided with means (power source ⊖) for applying a first voltage, such as $E_1$, to the control lines 321 and 322; the polarity of the privacy circuits 310 each corresponding to one of the plurality of key telephone sets 302 and 303 and each having a third relay 311 which operates to change the state of application of the first voltage to the state of application of a second voltage, such as $E_2$, only when the state of application of the first voltage $E_1$ exists in the control lines 321 and 322 in a case where one of the key telephone sets 302 and 303 connected to the control lines 321 and 322 has achieved the CO line seizing operation of closing the hook switch contacts 314-1 (and 314-2) and pressing the CO line seizing key to close the contact 309-1, and the plurality of polarized elements 312 each corresponding to one of the key telephone sets and each connected in parallel to the make contact 311-1 of the third relay 311 connected in series to the talking line conductors 319 and 320 so that the polarized element may lie in a forward direction with respect to a line current. Thus, there is provided the privacy function such that only the key telephone set, which performs the CO line seizing operation when the control lines 321 and 322 are being supplied with the first voltage $E_1$, is permitted to effect a call for the CO line, and that the key telephone set, which performs the CO line seizing operation when the control lines 321 and 322 are being supplied with the second voltage $E_2$, is prevented by the corresponding polarized element from achieving a call for the CO line. Further, a call for the CO line and an intercomm. talking operation during the power supply interruption can also be performed by the provision of means (308, 308-1 and 308-2) for activating the abovesaid first voltage applying means during a talking operation and reversing the polarities of connection of the talking line conductors 319 and 320 to the CO line terminals $L_1$ and $L_2$ during the power supply interruption from those during the talking operation; and by the provision of the second relay 306 having the change-over contacts 306-1 and 306-2, which connect the talking line conductors 319 and 320 to the CO line terminals $L_1$ and $L_2$ when a DC loop is formed across the control lines 321 and 322 during the talking operation, and supply an intercomm. current to the talking line conductors 319 and 320 in the forward direction of the polarized element when no DC loop is formed.

As has been described above, in the system of this invention, the presence of the preceding calling key telephone set is detected by the potential and porality between the control lines, and in the absence of the preceding calling key telephone set, the privacy circuit at actuated, and in the presence of the calling telephone set, the privacy circuit is made inoperative to perform the privacy function for the talking operation being made by the preceding key telephone set. Moreover, the talking operation can be achieved during the power supply interruption and furing the intercomm. talking operation, so that the privacy circuit can be constructed in the form of a simple circuit of the type seizing at the talking operation.

Figure 9:
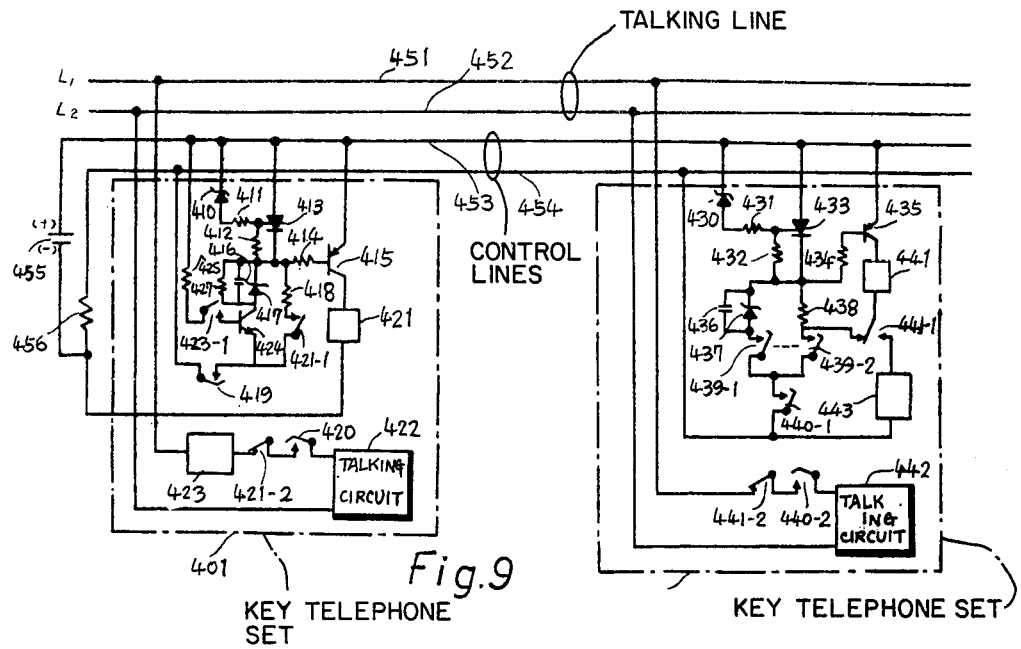
FIGS. 9, 10, 11 and 12 are circuit diagrams each illustrating another example of the privacy circuit employed in this invention.

If the privacy circuit is separately provided from a device seating the hook switch of the key telephone set in the example whown in FIG. 4, the privacy circuit can be modified as shown in FIG. 9, in which a remote control relay 432 is provided to transfer hook information to the privacy circuit.

In this embodiment, the thyrister 413 (or 433) of the key telephone set 401 (or 402) is self-held by a contact 421-1 of a privacy relay 421 (or 411). Moreover, each of Zener voltages of constant-voltage diodes 417 and 437 is established at a value higher than the operating voltage of each of relays 421 and 441. Each of Zener voltages of constant-voltage diodes 410 and 430 is established at a value higher than the Zener voltages of the contact-voltage diodes 417 and 437 but lower than the voltage of the source 455. The relay 423 is employed as hook information detecting means inserted in series to the talking circuit 422, while relays 421 and 443 are employed for disconnecting the talking circuits 422 and 441 from talking line conductors 451 and 452. The relays 421 and 441 are self-held by contacts 421-1 and 441, respectively. In the telephone set 401, the constant-voltage diode 410, resistors 411, 412 and 427, the capacitor 416, and the constant-voltage diode 417 forms voltage detection means, which constant-voltage diode 417 forms voltage detection means, which operates when the terminal voltage of the constant-voltage diode 410 or 417 of resistor means exceeds a constant value. In the telephone set 402, the constant-voltage diode 430, resistors 430, resistors 431 and 432, the capacitor 436 and the constant-voltage diode 417 form voltage detection means, which operates when the terminal voltage of the constant-voltage diode 430 or 437 exceeds a constant value. The thyristor 413 or 433 employed as switch means operates in response to the outputs of corresponding one of the above voltage detection means. The transistor 424 is employed in the telephone set 401 to connect the abobe voltage detection means and the above switch means across the control lines 453 and 454 by the contact 423-1 of the relay 423. As a result of the above construction, the switch 413 is connected across the control lines 453 and 454 by the transistor 424 in response to the operation of the relay 423 in the telephone set 401. Moreover, if the above switch means (413, 433) does not operate in each of the telephone sets 401 and 402 when the voltage across the control lines 453 and 454 exceeds the above constant value, the relay 421 or 441 operates to perform the privacy function.

Figure 10:
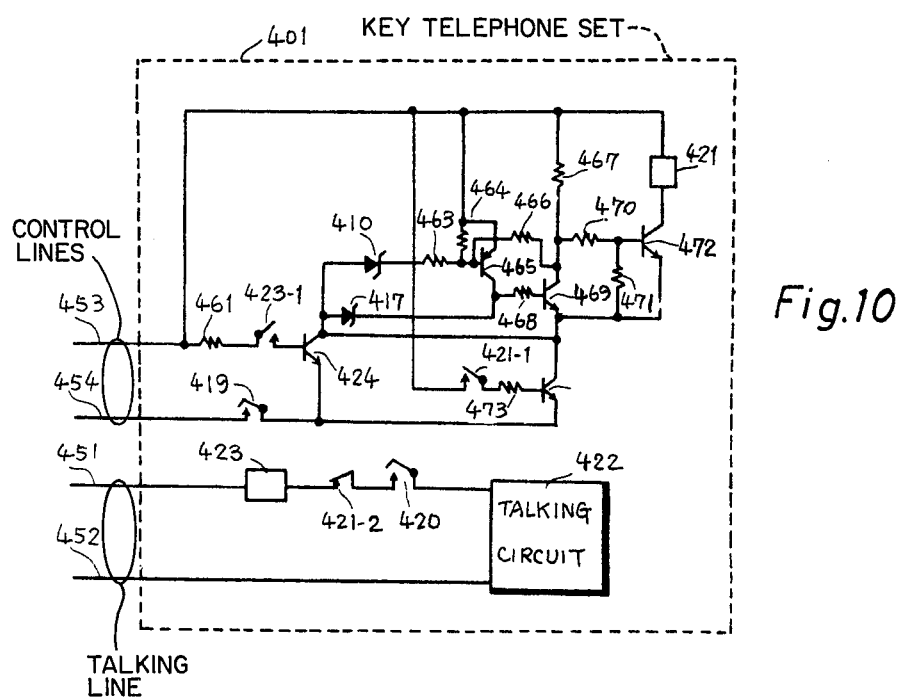

The example shown in FIG. 9 can be modified by replacing the thyrister (413, 433) by a flip-flop circuit of transistors 465 and 469 as shown in FIG. 10.

Figure 11:
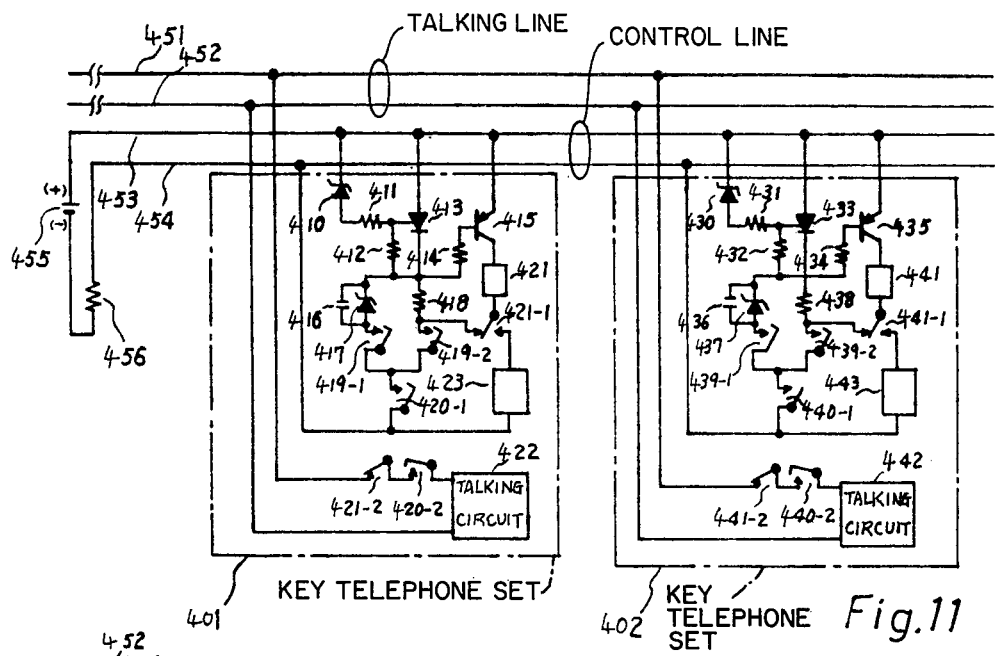

In the above-mentioned embodiment, a relay having a small working current (e.g. 10 milli-ampares) of high cost must be used as the relay 115 (or 421 or 441). To avoid the above defect, the privacy circuit can be modified as shown in FIG. 11, in which a relay 421 (or 441) of privacy function is directly connected across the control lines 451 and 452 until the relay 421 (or 441) is actuated.

Figure 12:
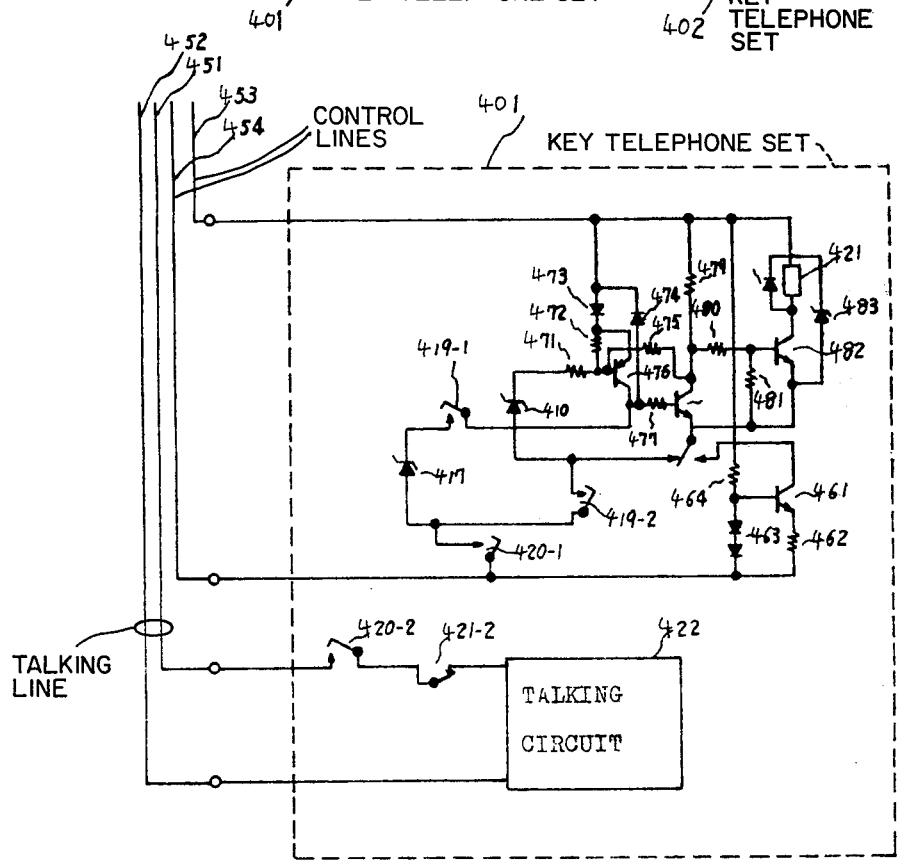

The thyrister 13 (or 13) may be replaced by a flip-flop circuit of transistors 476 and 478 as shown in FIG. 12.

What we claim is:

1. A key telephone system comprising:
a key service unit for selectively connecting a plurality of key telephone sets to a C0 line through a talking line;
two control lines connected between each of said key telephone sets and said key service unit;
said key service unit comprising a DC power source having a positive output voltage terminal and a negative output voltage terminal, first detector means connected to one of the two control lines for detecting a first state corresponding to an ON-hook condition of each of said key telephone sets where one of said two output voltages is applied across the two control lines to flow a current of a first predetermined value therethrough, first switch means connected to said DC power source and said first detector for connecting the other of the output voltages across the two control lines in response to the output of the first detector means, second detector means connected to the other of the two control lines for detecting a second state corresponding to an OFF-hook condition of one of said key telephone sets where the other of said two output voltages is applied across the two control lines to flow a current greater than a second certain value therethrough, and second switch means connected to said second detector means for connecting the talking line to the C0 line in response to the output of the second detector means.

2. A key telephone system comprising:
a key service unit for selectively connecting a plurality of key telephone sets to a C0 line through a talking line;
two control lines connected between each of said key telephone sets and said key service unit;
said key service unit comprising a DC power source having a positive output voltage terminal and a negative output voltage terminal, first detector means connected to one of the two control lines for detecting a first state where one of said two output voltages is applied across the two control lines to flow a current of a first predetermined value therethrough, first switch means connected to said DC power source and said first detector for connecting the other of the output voltages across the two control lines in response to the output of the first detector means, second detector means connected to the other of the two control lines for detecting a second state where the other of said two output voltages is applied across the two control lines to flow a current greater than a second predetermined value therethrough, second switch means connected to said second detector means for connecting the talking line to the C0 line in response to the output of the second detector means, third detector means connected to the C0 line for detecting the arrival of an incoming signal of the C0 line, first signal source means connected to said third detector means for sending out an output signal indicating reception of the incoming signal; and connecting means cooperative with said first signal source, said second detector means and said third detector means for connecting the first signal source to the control lines in response to the output signal of said third detector means and for disconnecting the first signal source from the two control lines in response to the output of said second detector means.

3. A key telephone system according to claim 2, in which each of the key telephone sets comprises a light emitting element having a current limiting characteristic capable of responding to one of two possible voltage polarities applied thereto, control means having a switching element with ON-OFF states for seizing the C0 line, and a speaker circuit; said light emitting element, said control means and said speaker circuit being connected in parallel to one another at one end of the two control lines; the control means further including a circuit element connected in series to said switching element for providing a voltage drop necessary for lighting said light emitting element in response to the applied voltage of the abovesaid polarity to which said light emitting element responds.

4. A key telephone system according to claim 3, in which the key telephone set further includes a talking circuit, and means for inserting in the talking line a resistor in series with the talking circuit to enable intercom calling; and the key service unit further includes fourth detector means and fifth detector means for detecting changes in the supply of line direct current of the talking line caused by the insertion of the series resistor, said fourth detector means having an operating characteristic for operating in response to any ordinary line current of the talking circuit, and said fifth detector means having an operating characteristic for operating in response to a line current flowing when the series resistor is connected to the talking circuit; said key service unit further comprising means connected to said fourth detector and said fifth detector for connecting a calling signal generator to the two control lines only when one of said fourth detector and said fifth detector does not produce any output but the other produces an output.

5. A key telephone system according to claim 4, in which said key telephone set includes, a CO line holding key for providing a line holding function, a capacitor circuit comprised of a plurality of capacitors to be switched from a parallel to a series interconnection with one another by the actuation of said CO line holding key, and a CO line selecting key connected across the two control lines through the capacitor circuit; and in which said key service unit further includes sixth detector means connected to one of said two control lines for detecting a current value smaller than said second predetermined current value of said second detector means, a first relay having a slow-releasing characteristic and connected for actuation by the output signal of said second detector means, and a second relay having a self-holding circuit operating only when a current below the detection level of both said second detector means and said sixth detector means is applied to the two control lines while the first relay is actuated and the key telephone set further including additional control means for applying, in response to the operation of the first relay, the sum of charged voltages of said capacitors across the two control lines as a voltage exceeding a voltage applied from the key service unit, said second detector means and said sixth detector means being simultaneously restored to respective non-output states by the operation of the CO line holding key to actuate the second relay, thereby achieving a CO line holding operation.

6. A key telephone system according to claim 5, in which said additonal control means includes a time-limited switch circuit connected for discharging said capacitor circuit within a predetermined short time in response to the closing of the CO line holding key.

7. A key telephone system according to claim 3, in which the key telephone set further includes a privacy circuit for inhibiting the connection of another of said key telephone sets to said talking line in response to an off-hook condition of one of said key telephone sets; said privacy circuit comprising power source input terminal means for receiving a power signal and connected in series with said light emitting element having the current limiting characteristic control signal input terminal means connected to the two control lines for receiving a control signal, a constant-voltage diode having an operation voltage level higher than the voltage drop of the circuit element developing the voltage drop necessary for lighting the light emitting element and connected to the control signal input terminal means, and connecting means including a bistable circuit which is supplied with a current from the power source input terminal means and set for connecting the talking circuit to the talking line only when a current flows in the constant-voltage diode.

8. A key telephone system according to claim 7, in which said connection means includes a relay having a contact to self-hold said bistable circuit.

9. A key telephone system according to claim 3, in which said connection means includes a relay directly connected across said two control lines until the same relay is actuated.

10. A key telephone system according to claim 5, further comprising:
said power source applying one of said two output voltages to the two control lines only when none of said key telephone sets seizes the CO lines;
a plurality of privacy circuits, each corresponding to one of the plurality of key telephone sets and each having a third relay connected to the two control lines to operate for converting a ready state where said one voltage is applied to the two control lines to a talking state where the other voltage is applied to the two control lines only when said one voltage is applied to the two control lines when one of the key telephone sets having the third relay has performed the CO line seizing operation; and
a plurality of polarized elements, each corresponding to one of the key telephone sets and connected in parallel to a make contact of the third relay and in series to the talking lines in a forward direction with respect to the line current thereof, control means connected to said talking line and said power source for providing a privacy function where only the key telephone set having performed the CO line seizing operation, when said one voltage is applied to the control line, is permitted to effect a call for the CO line, and where the key telephone set having performed the CO line seizing operation, when the other voltage is applied to the two control lines, is inhibited to effect a call for the CO line by the polarized element corresponding to the key telephone set.

11. A key telephone system according to claim 10, in which each of said privacy circuits includes a constant-voltage diode having an operation voltage corresponding to the other voltage, and said third relay has a contact for connecting the constant-voltage diode across the two control lines, when said one voltage is applied across the two control lines.

12. A key telephone system comprising:
a key service unit for selectively connecting a plurality of key telephone sets to a CO line through a talking line;
two control lines;
a DC power source for producing an output voltage higher than a reference potential by a certain potential difference and an output voltage lower than the reference potential by a certain potential difference;
said key service unit comprising:
control means for normally applying, as a first state corresponding to an ON-hook condition of each of said key telephone sets, one of the two output voltages from the DC power source to the other of said two control lines and applying, as a second state corresponding to an OFF-hook condition of one of said key telephone sets, the other of said output voltages to the other of said two control lines when a DC loop is formed across the two control lines at the time of seizing the CO line by one of said key telephone sets; and
connection means connected to said control means for connecting a talking circuit to the CO line upon formation of a DC loop across the control lines at the time of seizing one of said key telephone sets at the first state, except when the CO line is seized by one of said key telephone sets at the second state, and for holding the above-connected state of the talking circuit to the CO line even when the first state shifts to the second state in response to said OFF-hook condition of one of said key telephone sets.

13. A key telephone system according to claim 12, in which said control means comprises a first detector including a transistor coupled with one of the two control lines for detecting the formation of the DC loop, and a relay circuit controlled by the first detector for switching the connection of the other of said two control lines to the input terminal of the just-above mentioned detector.

14. A key telephone system according to claim 12, in which the connection means comprises diodes and a relay inserted in the DC loop through said diode in the forward direction for a current flowing at the first state, means for inserting the relay in the DC loop through a contact of the relay and additional diodes in the forward direction for a current flowing at the second state, and means for connecting the talking circuit to the CO line through the contact of the relay.

15. A key telephone system according to claim 13, wherein a transistor is connected to the relay.

16. A key telephone system comprising:
a key service unit connected to a CO line;
a plurality of key telephone sets connected in parallel to the key service unit through a talking line;
two control lines connected between each of said key telephone sets and said key service unit;
means connected to a commercial AC supply for applying a first voltage to the two control lines at a condition where power is supplied from said commercial AC supply;
a plurality of privacy circuits, each corresponding to one of the plurality of key telephone sets and each having a relay connected to the two control lines to operate for converting a ready state where a first voltage is applied to the two control lines to a talking state where a second voltage is applied to the two control lines only when the first voltage is applied to the two control lines when one of the key telephone sets having the relay has performed the CO line seizing operation;
means for reversing the polarity of connection of the talking line to the CO line during an interruption of power supply from said commercial AC supply;
a plurality of polarized elements, each corresponding to one of the key telephone sets and each connected in parallel to a contact of the relay, connected in series to the talking line, in the forward direction with respect to the polarity of the line current flowing during a power supply interruption from said commercial AC supply; and an additional relay having a switch for connecting the talking line to the Co line when a DC loop is formed across the two control lines during power supply from said commercial AC supply and supplying a line current to the talking line in the forward direction of the polarized element, thereby providing a privacy function, where only the key telephone set having performed the CO line seizing operation, when the first voltage is applied to the two control lines, is permitted to effect a call for the CO line, and where the key telephone set having performed the CO line seizing operation, when the second voltage is applied to the two control lines, is inhibited to effect a call for the CO line by the polarized element corresponding to the key telephone set, and enabling a call for the CO line and an intercomm. talking operation during the power supply interruption.

17. A key telephone system according to claim 16, in which each of the privacy circuits includes a constant-voltage diode of an operation voltage corresponding to the second voltage, and the third relay has a contact for connecting the constant-voltage diode across the two control lines when a voltage corresponding to the first voltage is applied across the two control lines.

* * * * *